US012358418B2

(12) United States Patent
Thomas et al.

(10) Patent No.: US 12,358,418 B2
(45) Date of Patent: Jul. 15, 2025

(54) METHOD FOR OPERATING A LIGHTING DEVICE OF A MOTOR VEHICLE, LIGHTING DEVICE AND MOTOR VEHICLE

(71) Applicant: AUDI AG, Ingolstadt (DE)

(72) Inventors: Werner Thomas, Oberwöhr (DE); Marc Maier, Collenberg (DE); Christoph Häussinger, Eichstätt (DE); Michael Horn, Ingolstadt (DE); Daniel Ehrlichauf, Neuburg/Donan (DE); Stephan Heider, Wettstetten (DE); Alexander Becker, Gungolding (DE)

(73) Assignee: AUDI AG, Ingolstadt (DE)

( * ) Notice: Subject to any disclaimer, the term of this patent is extended or adjusted under 35 U.S.C. 154(b) by 213 days.

(21) Appl. No.: 18/002,697

(22) PCT Filed: May 27, 2021

(86) PCT No.: PCT/EP2021/064131
§ 371 (c)(1),
(2) Date: Jun. 26, 2023

(87) PCT Pub. No.: WO2021/259583
PCT Pub. Date: Dec. 30, 2021

(65) Prior Publication Data
US 2024/0017664 A1    Jan. 18, 2024

(30) Foreign Application Priority Data
Jun. 25, 2020   (DE) .................... 10 2020 116 740.7

(51) Int. Cl.
*B60Q 1/26*         (2006.01)
(52) U.S. Cl.
CPC ............ *B60Q 1/26* (2013.01); *B60Q 2400/30* (2013.01); *B60Q 2400/40* (2013.01)

(58) Field of Classification Search
CPC ... B60Q 1/26; B60Q 2400/30; B60Q 2400/40
See application file for complete search history.

(56) References Cited

U.S. PATENT DOCUMENTS

| 6,587,573 B1 | 7/2003 | Stam et al. |
| 8,378,781 B1 | 2/2013 | Peterson |

(Continued)

FOREIGN PATENT DOCUMENTS

| AT | 512544 A1 | 9/2013 |
| CN | 105383369 A | 3/2016 |

(Continued)

OTHER PUBLICATIONS

International Search Report and Written Opinion of the International Searching Authority directed to International Patent Application No. PCT/EP2021/064131, mailed Aug. 18, 2021; 18 pages.

(Continued)

*Primary Examiner* — Quan Zhen Wang
*Assistant Examiner* — Mancil Littlejohn, Jr.
(74) *Attorney, Agent, or Firm* — Sterne, Kessler, Goldstein & Fox P.L.L.C.

(57) ABSTRACT

The present disclosure relates to a method for operating a lighting device for a motor vehicle, wherein the lighting device has at least an exterior lamp and a control device. The exterior lamp has an illuminating area having at least two independently controllable segments each comprising at least one light source, wherein, in at least one dynamic operating mode of the control device, for at least one dynamic group of the segments comprising at least two segments a pseudo-randomized or randomized, temporally variable lighting operation of the segments of the dynamic group takes place.

24 Claims, 6 Drawing Sheets

(56) References Cited

U.S. PATENT DOCUMENTS

| | | | |
|---|---|---|---|
| 9,563,010 B2 | 2/2017 | Reinprecht et al. | |
| 9,788,374 B1* | 10/2017 | Holleschau | F21S 8/061 |
| 10,118,568 B2 | 11/2018 | Salter et al. | |
| 10,232,765 B2 | 3/2019 | Fimeri et al. | |
| 2005/0254240 A1 | 11/2005 | Lawrence et al. | |
| 2007/0183152 A1 | 8/2007 | Hauck et al. | |
| 2015/0154896 A1* | 6/2015 | Dellock | F21S 10/023 |
| | | | 362/546 |
| 2016/0059768 A1 | 3/2016 | Niemz | |
| 2018/0257552 A1 | 9/2018 | Hellge | |

FOREIGN PATENT DOCUMENTS

| | | |
|---|---|---|
| CN | 107206929 A | 9/2017 |
| DE | 102016101103 A1 | 7/2016 |
| DE | 102015216746 A1 | 3/2017 |
| DE | 102015119549 A1 | 5/2017 |
| DE | 202017101348 U1 | 6/2017 |
| EP | 1 488 447 B1 | 11/2014 |
| JP | S57-44543 A | 3/1982 |

OTHER PUBLICATIONS

International Preliminary Report on Patentability directed to International Patent Application No. PCT/EP2021/064131, issued Sep. 9, 2022; 13 pages.

\* cited by examiner

| 50  | 120 | 60  | 56  | 72  | 180 | 78  | 101 | 74  |
| --- | --- | --- | --- | --- | --- | --- | --- | --- |
| 66  | 181 | 100 | 198 | 123 | 98  | 78  | 52  | 250 |
| 80  | 250 | 75  | 92  | 110 | 131 | 50  | 125 | 146 |
| 128 | 96  | 60  | 235 | 66  | 126 | 231 | 152 | 80  |
| 164 | 73  | 66  | 182 | 150 | 80  | 250 | 123 | 220 |
| 70  | 123 | 50  | 90  | 73  | 221 | 78  | 183 | 114 |

METHOD FOR OPERATING A LIGHTING DEVICE OF A MOTOR VEHICLE, LIGHTING DEVICE AND MOTOR VEHICLE

TECHNICAL FIELD

The present disclosure relates to a method for operating a lighting device for a motor vehicle, wherein the lighting device has at least one exterior lamp and a control device, wherein the exterior lamp has an illuminating area having at least two independently controllable segments each comprising at least one light source. In addition, the present disclosure relates to a lighting device and a motor vehicle having such a lighting device.

BACKGROUND

Motor vehicles typically have a plurality of exterior lamps which are at least partially designed for better visibility of the motor vehicle during day and/or at night, for the purpose of improving the visibility of a passenger and/or for signaling to other road users. Examples of such exterior lamps are rear lights (also referred to as tail lights or tail lamps), daytime running lights, headlights, brake lights and direction indicators. Today, exterior lamps on motor vehicles are designed to meet any local or country-specific legal requirements for luminous intensity, attachment height, switching logic and further parameters, which may be collectively referred to as light values.

However, a plurality of exterior lamps, in particular those conducive to better visibility by other road users, are also used as a differentiating design feature for vehicle manufacturers and/or vehicle designers. This development has been promoted in particular by new concepts of exterior lamps which utilize light-emitting diodes (LEDs), organic light-emitting diodes (OLED) and/or lasers. These illumination technologies for realizing the light sources of the exterior lamp make it possible to combine, for example, legal requirements for the light function, specifically the light values, and design requirements, to provide a customized exterior lighting design for motor vehicles.

This means that exterior lamps currently known for motor vehicles are designed such that both the particular legal requirements for the light functions, for example daytime running light or rear light, and also the comfort and/or driver assistance functions, for example glare-free high beam, cornering light and dynamic turn signal light, may be implemented together with a fixed visual layout, i.e., a design. However, in the course of increasing functional enrichment and digitalization, it is disadvantageous that previous lighting devices for motor vehicles only allow for a fixed, predefined lighting design. This means that design differentiations, in particular with regard to the geometric appearance of an exterior lamp, are displayed via various hardware variants which use differently arranged light sources and/or different types of light sources. The most visually sophisticated design is usually coupled with the highest equipment variant.

EP 1 488 447 B1 describes an electrically illuminated flame simulator that may be used decoratively or as a warning device or emergency lighting in road traffic. The flame simulator comprises at least two light sources which may be illuminated randomly, sequentially or semi-randomly in order to produce a flickering and moving light effect corresponding to a real flame.

US 2007/0183152 A1 relates to an animated light source comprising a plurality of solid-state emitters and a control circuit. The emitters may be selectively supplied with energy to generate the appearance of moving light within the generated beam.

U.S. Pat. No. 8,378,781 B1 discloses a system for controlling a light chain, wherein each light or each group of lights has an associated microcontroller. After unique identification numbers are used, brightness and color information may be specifically assigned to lights.

A method for generating a running light effect on a light guide structure is described by AT 512 544 A1. In this context, the light guide structure is to have at least two light feed positions, each with associated light sources, wherein the light guide is set up to guide the fed-in light as well as to emit light due to interference points formed on the light guide. The brightness of the feeding light sources may be controlled time-dependently according to specifiable dimming curves.

DE 10 2015 119 549 A1 relates to a vehicle having turn signal lamps and a method for generating a directional indication for following traffic. In this regard, it is proposed that in order to generate a directional indication for the following traffic to bypass the vehicle, an optical sweeping effect created by a first turn signal lamp and an optical sweeping effect created by a second turn signal light point in the same sweeping direction.

DETAILED DESCRIPTION

The present disclosure is therefore based on the task of specifying a possibility of improving visibility and for obtaining higher attention for exterior lamps of a motor vehicle.

To solve this objective, the features of claim 1 are provided according to the present disclosure in a method of the type mentioned at the beginning.

A control scheme can therefore be understood as a control image which determines the appearance of the exterior lamp after it preferably specifies which segments of the illuminating area of the exterior lamp are to be operated and how brightly, which means that the individual segments, at least those that are to be operated luminously, are assigned target values for brightness (target brightnesses). The control schemes change over time with a pseudo-randomized or randomized portion. In this regard, the pseudo-randomization or randomization may particularly preferably relate to at least the selection of the segments to be operated luminously and/or to be changed with respect to their brightness, that is to say to be operated variably luminously; in some exemplary embodiments, the pseudo-randomization or randomization may additionally or alternatively relate to the target brightnesses. In general, it can be said that the segments are preferably at least partially dimmable, which means that their brightness may be controlled by the control device in that the latter assigns target brightnesses of the control scheme.

In the context of the present disclosure, the change over time by means of the temporal sequence of control schemes results in a dynamic light signature in the sense of a temporal change in the appearance of the exterior lamp, specifically its illuminating area. While it may be conceivable in principle outside of the present disclosure to use a fixed, specified or specifiable sequence of control schemes, provision is made for a particularly dynamic, appealing and attention-grabbing effect according to the present disclosure to determine the control schemes at least partially in a pseudo-randomized or randomized manner. The pseudo-randomized or randomized control by the control device therefore means in particular that for at least a part of the time steps in which the control device controls the segments, a selection is made by a pseudo-random or random approach whether and/or with which brightness each segment of the dynamic group is to be operated.

In principle, the illuminating area is therefore divided into individually controllable segments within the scope of the present disclosure. The exterior lamp therefore has an illuminating area which may be formed by one or more lighting units of the exterior lamp, for example by at least one OLED and/or at least one LED matrix. The illuminating area in turn is divided into segments which are each formed from at least one (single) light source and define partial areas of the illuminating area. If, which is particularly preferred according to some embodiments, a segmented OLED is used, the segments result from the segmentation of the segmented OLED, in other words, each segment is formed by a partial OLED as a light source. If an LED matrix is used, segments may have an LED as a light source, but also additionally or alternatively a plurality of LEDs may be combined to form one segment.

Thus, specifically, the segments may be formed by a segmented OLED of the exterior lamp and/or at least one LED matrix of the exterior lamp. Organic light-emitting diodes (OLEDs) have already been proposed for use in motor vehicles for some time. Known techniques allow in particular flat OLEDs to be divided into a certain number of segments which may be controlled independently. Matrices of conventional light-emitting diodes (LEDs) have already been proposed for headlamps, for example, to implement cornering light functions or the like.

Particularly advantageously, it may be provided that all segments have the same luminance and/or emission characteristic. In other words, the outer surface may be designed such that a so-called Lambertian emitter is formed in which the luminance and the emission behavior (angular distribution) of each segment is identical. Such an implementation may be particularly advantageous using an OLED as a homogeneous area light source, which may be divided into segments of equal size, for example.

In summary, the present disclosure relates to the realization of a dynamic light signature, which is at least pseudo-randomly variable at least in part, on the basis of segmented exterior lamps. In other words, the exterior lamp appears in a vivid appearance, making it possible to generate new visual effects and provide vehicle lighting with a high-quality appearance. The dynamic operating mode generates dynamic light signatures that are more recognizable and generate greater attention, especially without causing more glare. The at least pseudo-randomized light function may in particular indicate a specific vehicle equipment, a specific vehicle state or a special driving mode, for example an at least partially autonomously driving motor vehicle, an energy efficiency mode or the like. In general, it can therefore be stated that at least one of the at least one dynamic operating modes may indicate an operating state of the motor vehicle, in particular at least partially autonomous operation and/or the activity of a specific driver assistance system.

The dynamic operating mode may be used when the motor vehicle is at a standstill, for example for so-called coming-home functions and/or leaving-home functions, however, it is particularly advantageously used during driving operation of the motor vehicle. When used in the driving mode of the motor vehicle, it is expedient to ensure that certain specifications for the light function that the exterior lamp is to fulfill are taken into account, whether these are defined by the light function itself and/or regulations specified by the manufacturer or by law, in particular also regulations relevant to approval (homologation).

In other words, during operation of at least one exterior lamp in the dynamic operating mode, the control device may be designed to meet at least one requirement of a set of requirements, wherein the requirement may be implemented as at least one boundary condition related to the appearance of the exterior lamp and/or limiting the determination of the control schemes. In other words, the present disclosure may be used to generate a dynamic, vivid light signature using hardware having a segmented illuminating area, which, however, is able to continue to meet all requirements, in particular those relating to approval, and may therefore be used without any problems in the driving mode of the motor vehicle. In particular, it may be provided in this context that as at least one of the at least one boundary condition (and thus requirement) the maintaining of at least one fixed total brightness value of all luminously operated segments over the temporal sequence and/or at least one specified geometric extent of the geometric appearance of the group defined by the luminously operated segments is used. This means that it can be ensured that in each time step, that is to say through each control scheme, in particular the total brightness, for example, total luminous intensity, remains the same in the dynamic operating mode, wherein the at least one total brightness value particularly preferably is within a range limited by a minimum value and a maximum value. This range may arise, for example, from legal and/or other requirements. Particularly advantageously, there is no change in the total brightness in the dynamic operating mode, but rather the appearance is changed dynamically at least pseudo-randomly in such a way that the total brightness, which originates from the illuminating area of the exterior lamp, in particular the total light intensity, remains the same for at least one solid angle and/or one solid angle interval, so that a dynamic, vivid light signature is thus produced without the fundamental external effect of the exterior lamp being changed. In other words, the attention is drawn to the exterior lamp through improved recognizability without compromising its purpose, i.e., the lighting function, and wherein in particular legal requirements may be met. In this context, the at least one total brightness value as a total luminous intensity value may refer in particular to a specific solid angle or solid angle range, wherein in exemplary embodiments a plurality of total luminous intensity values may also be used for different solid angles and/or solid angle ranges.

In addition to boundary conditions related to the total brightness requirements, it is of course also possible to ensure compliance with further requirements on the part of the control device, which may accordingly be formulated as boundary conditions for the determination of control schemes. Other requirements may relate to other light values, in particular parameters of the exterior lamp that are relevant for homologation. For example, requirements may relate to geometric extents of the geometric manifestation of the illuminating area, wherein the geometric manifestation is defined by the luminously operated segments and thus their luminously operated light sources. For example, one requirement may be that the contiguous geometric region defined as a result of the illumination of segments does not fall below or exceed a certain minimum extent and/or maximum extent.

Therefore, in summary, by using boundary conditions, the requirements of a set of requirements for the exterior lamp may also be met in the case of the dynamic, at least pseudo-randomized lighting operation described herein. In this context, use of the present disclosure is proposed in particular for exterior lamps whose light functions are not affected by dynamic changes in appearance and which are therefore particularly suitable for dynamic lighting signatures, i.e., in particular exterior lamps which serve to improve the visibility of one's own motor vehicle as a light function. In particular, the at least one exterior lamp may be a rear light and/or a daytime running light. In the case of such exterior lamps, no further light functions, such as, for example, adaptable illumination regions, are usually provided, wherein the concept proposed here, however, is in principle also suitable for other exterior lamps, for example headlights, when it is used within the scope of a standard function, for example normal low beam and/or coming-home/leaving-home functions.

The method according to the present disclosure and correspondingly also the lighting device according to the present disclosure thus make it possible to provide both fulfillment of the requirements, in particular those relating to approval and/or specified by laws, and high-quality, dynamic design in order to increase recognizability and/or the drawing of attention and/or to provide a particularly appealing exterior of the motor vehicle even at night, in particular also when the vehicle is being driven. The basic light technologies required for this purpose, such as segmented OLEDs and/or LED matrices, are already available as the current state of the art and ready for use. Random generators, which may comprise hardware components and/or software components, already exist in the prior art and may be used within the scope of the present disclosure, for example, a deterministic random generator for pseudo-random numbers, a non-deterministic random generator and/or a mixed form.

As has already been mentioned, the control schemes may be determined by the control device according to at least one boundary condition which is related to the appearance of the exterior lamp and/or which limits the determination of the control schemes. In this context, boundary conditions do not necessarily have to relate to the described requirements of a set of requirements, but may also be set in order to configure the dynamics of the appearance, i.e., the dynamic light signature, in such a way that an intended overall impression is created. In this context, it may be provided, for example, that at least one of the at least one boundary condition describes a minimum and/or a maximum and/or a fixed number of segments to be operated in a luminous and/or variable manner in the dynamic group and/or a minimum and/or a maximum brightness of segments to be operated luminously, and/or a minimum and/or maximum and/or defined step size of the brightness from one control scheme to the next and/or a definition of segments to be operated with constant brightness. Thus, for example, boundary conditions may be used to define the framework into which the pseudo-randomization or randomization takes place. Here, a large number of possible exemplary embodiments are conceivable, some of which will be presented in more detail below by way of example.

In a particularly advantageous development of the present disclosure, it may be provided that a plurality of disjoint, in particular spatially contiguous dynamic groups of an exterior lamp having different boundary conditions are used, in particular dynamic groups aligned with different sides of the motor vehicle. For example, different requirements may be placed on different dynamic groups, as is known, for example, from rear lights that also extend from the rear to a right or left side of the vehicle at one corner of the vehicle. For example, there are then requirements that at least the portion of the illuminating area that is aligned perpendicular to the longitudinal direction of the vehicle is to be operated with lower brightness, in particular lower total luminous intensities. Such an embodiment, as described here, now makes it possible for such cases and similar cases to define, for example, maximum total luminous intensities and/or total luminous intensities to be maintained constantly, or in general total brightnesses, for different dynamic groups. Conveniently, the underlying pseudo-randomization algorithm or randomization algorithm, usually at least part of a determination algorithm for the control schemes, may be chosen to be the same for the at least two dynamic groups, possibly also as a common determination algorithm, in order to be able to provide a coherent overall appearance of the exterior lamp. In this context, it may also be particularly advantageous if at least one common boundary condition is also used for at least two of the plurality of dynamic groups of an exterior lamp. In this way, it is possible with particular advantage to divide the individually controllable segments of the exterior lamp into locally contiguous dynamic groups, wherein the advantage is that, for example, the contribution of the individual groups to the total brightness of the exterior lamp is configurable in a differentiated manner. This makes it possible to compensate for the different contributions to the total brightness by the segments, for example, by different beam angles, and to achieve an overall constant total brightness despite the dynamic control.

Here, it should also be noted in general at this point that, in the case of a boundary condition describing a total brightness value to be maintained for the entire dynamic group and in the case of pseudo-randomized or randomized determination of the target brightnesses for the various segments to be luminously operated, a particularly advantageous embodiment may provide that after the determination of the target brightnesses for segments of the dynamic group that are to be operated luminously, a sum of all the target brightnesses is formed and compared with the specified total brightness value in order to determine a deviation value, wherein the deviation value is uniformly distributed for all target brightnesses, optionally taking into account a minimum and/or a maximum brightness as a further boundary condition, in order to produce the specified total brightness value as a sum over all the target brightnesses on the segments to be operated luminously.

The present disclosure provides that in at least one of the at least one dynamic operating mode the control device controls the segments in successive time steps, wherein a switching interval is defined as a multiple of the time step and, for determining the temporal control schemes of the sequence associated with a respective time step:

for each switching interval, a first subgroup of the segments of the dynamic group having inactive segments to be operated statically for the switching interval and a second subgroup having active segments to be operated in a temporally variable manner for the switching interval is selected in a pseudo-randomized or randomized manner, in each switching interval for each time step, the brightness is changed exclusively for the active segments, in particular monotonically increasing and/or falling in time within the switching interval and/or according to a fixed step size specified as a boundary condition.

According to the present disclosure, therefore, in the switching time interval for a second subgroup of luminously operated segments, wherein in particular the segments of the first subgroup are also being operated luminously, wherein the second subgroup is determined in a pseudo-randomized or randomized manner, a gradual change in their brightness takes place, so that overall, a dynamic and vivid but nevertheless calm and pleasant image is produced. The change in brightness, which may be limited, for example, by boundary conditions, as described, which may of course also apply to the absolute target brightnesses, may of course, also be selected in a pseudo-randomized or randomized manner in the degrees of freedom remaining due to the boundary conditions in order to further promote the dynamic, varied impression.

In this case, it is provided that, in the case of a fixed total brightness value that is specified as a boundary condition, the change over the time steps of a switching interval takes place in such a way that the brightness increases and decreases cancel each other out, in particular for a pair of active segments in each case. In the latter case, the number of active segments is, accordingly, selected even. If, for example, there is a step size specified as a boundary condition, it may be provided that whenever the brightness of a particular active segment is increased at the next time step, the brightness of another active segment assigned to it at least temporarily is reduced in accordance with the specified fixed step size. This ensures that the specified, fixed total brightness value is maintained within the switching interval.

An initial brightness distribution at the beginning of the first switching interval, i.e., in particular a first control scheme, may be fixedly specified, but is preferably determined in a pseudo-randomized or randomized manner, in particular adjusted with respect to boundary conditions limiting the total brightnesses, as described above, by uniform distribution of the deviation value. Various approaches are conceivable for subsequent switching intervals.

Thus, a further specific development of this embodiment variant may provide that as a starting point for a first time step of a subsequent switching interval, at least for the now active segments, in particular for all segments of the dynamic group, the brightnesses used in the last time step of the preceding switching interval are used or that for each switching interval, in particular at least for the active segments, new brightnesses are determined in a pseudo-randomized or randomized manner as a starting point. A variant in which the target brightnesses continue to be used between switching intervals exhibits a certain continuity and a somewhat calmer dynamic appearance, while a higher vividness may be implemented by pseudo-randomized or randomized re-selection of brightnesses for at least a portion of the segments of the dynamic group.

Before discussing further specific variants of the present disclosure, it should also be noted that the control device may of course be designed to use a plurality of different dynamic operating modes, for example to allow a user-side selection or, in a more preferred embodiment, to indicate different operating states of the motor vehicle, in particular an at least partial autonomous operation and/or the activity of a specific driver assistance system, by using a plurality of different dynamic operating modes. Nevertheless, method components and parameters that ultimately have the same effect are to be referred to in the same way for the specific variants of dynamic operation modes presented herein for better readability, even though a plurality of different variants of these dynamic operation modes may be implemented in a single control device and may thus be available for use.

In a second, advantageous, specific variant of a dynamic operating mode of the method according to the present disclosure, it may be provided that in at least one of the at least one dynamic operating mode the control device controls the segments in successive time steps, wherein a switching interval is defined as comprising one or more time steps, and for each switching interval a control scheme with a first subgroup of the segments of the dynamic group having switched-off segments that are not to be luminously operated for the switching interval and a second subgroup having switched-on segments that are to be luminously operated for the switching interval is determined in a pseudo-randomized or randomized manner. Here, it may be conveniently provided that the brightnesses of the switched-on segments are also respectively selected in a pseudo-randomized or randomized manner for each switching interval. In this simple specific implementation variant, a new, pseudo-random or random appearance is ultimately generated for each switching interval, which may also correspond to one of the time steps. Here, a random or pseudo-random target brightness may be specified in particular for each of the existing segments that are to be luminously operated. In other words, in each switching interval, a certain number of luminously operated, switched-on segments of a second subgroup are assigned an at least pseudo-randomized target value for brightness, while the remaining, switched-off segments, which are not to be operated luminously, are assigned the target brightness "zero". Conveniently, boundary conditions may also be used herein to specify at least a framework for the pseudo-randomization or randomization, for example a minimum and/or a maximum brightness of segments to be luminously operated and/or a fixed number of segments to be luminously operated. It is also convenient in this context if some kind of animation is used, which is conceivable in the case of a switching interval comprising several time steps. Then it may be provided that the switching-on and/or the switching-off of the switched-on elements towards a maximum brightness or from the maximum brightness, respectively, takes place stepwise over several time steps of the switching interval. For example, the brightness may be controlled from the current target brightness in a linear ramp to zero (or a new target brightness, if the segment is also a member of the new second subgroup) in a decreasing manner (in case of a new target brightness also in an ascending manner if necessary).

In an expedient embodiment in this variant, it may also be provided for a plurality of temporally offset switching intervals to be used in such a way that a fixed total brightness value for the dynamic group is maintained despite a stepwise switching on and/or off. Consequently, it is possible to use mutually offset switching intervals in such a way that, for example, linear ramps supplement one another when switching on and off such that, although, for example, appearances (control images) merge smoothly into each other so to speak, a constant, fixed total brightness, in particular total luminous intensity, is obtained.

In a third variant conceivable within the scope of the present disclosure for the specific determination of control schemes in a dynamic operating mode, it may be provided that, in at least one of the at least one dynamic operating mode, the control device controls the brightness of segments that are selected in a pseudo-randomized and/or randomized manner and are to be luminously operated in a variable manner in accordance with at least two triangular pulses that are offset against each other, in particular such that a fixed total brightness value for the dynamic group is maintained by the offset of the triangular pulses. The at least two triangular pulses, according to which the brightness of a segment to be luminously operated is initially increased, then decreased or respectively initially decreased, then increased, in a brightness interval, may be defined by a few parameters. Here, it may be provided that the at least two triangular pulses do not start at the same time, wherein, however, it may occur that due to different time durations a least two of the at least two triangular pulses start or end simultaneously. Once a segment completes a triangular pulse, another segment may be selected in a pseudo-randomized or randomized manner and initialized with the triangular pulse, whereupon the sequence repeats. In other conceivable variants, other functions may also determine the characteristic of the brightness, for example sine pulses or the like, which, however, may complicate the addition to a fixed total brightness at any time.

In an expedient, general development of the present disclosure, it may be provided that, in addition to the at least one dynamic group, at least one static group which is disjoint to the at least one dynamic group and which comprises at least one segment is used, the segments of which are permanently switched on or permanently switched off, in particular with constant target brightness. This makes it possible, so to speak, to fixedly specify a certain basic structure that acts, for example, as a kind of static framework for the temporally dynamic activity of the dynamic group. However, such static groups may also be used in order, for example, to meet or simplify the fulfillment of various of the requirements, e.g., those relating to approval, already required at the beginning. If, for example, certain geometric extents of the geometric appearance are to be implemented, an expedient development in this context may provide that at least one of the at least one static group comprises segments that are always illuminated and indicate the edge of the illuminating area, in particular the corners thereof. In this way, the boundaries of the illuminating area of the exterior lamp are generally visible. It should be noted at this point that it is of course also possible within the scope of the present disclosure to integrate the static group into the dynamic group in terms of control, for example as segments to be operated within the dynamic group as having a fixed brightness or respectively as fixedly switched off, as explained above as a boundary condition.

In the case of a plurality of exterior lamps, it is particularly advantageous to take into account the overall design of the motor vehicle, i.e., in particular the arrangement of these exterior lamps on the motor vehicle, and in the case of exterior lamps arranged on the same or on adjacent sides, the overall impression thereof. Thus, a particularly preferred embodiment may provide that the lighting device comprises two exterior lamps which are arranged symmetrically, in particular with respect to at least one axis of symmetry, and/or are spatially adjacent and assigned to one another and have corresponding dynamic groups for which common control schemes are determined. This means that at least two of the exterior lamps may be operated in a coordinated manner. For example, the same boundary conditions and the like may apply to the exterior lamps. In a specific, advantageous example, it may be provided that the two exterior lamps assigned to one another are provided symmetrically on one side of the motor vehicle, wherein the control schemes are determined in a mirrored manner such that the resulting appearances are symmetrical to the vehicle center of the respective side. This may relate, for example, to two daytime running lights and/or two rear lights.

In general, it can therefore be said that the function logic described herein may, for example, be carried out for each side of the vehicle; for example, all exterior lamps and thus all surface lighting units within one side of the vehicle or even on adjacent sides of the vehicle may be involved in the control operation. This means that a determination algorithm may, for example, determine the control schemes per vehicle side, in particular segments that are to be luminously operated, and their brightness level. For example, in the case of so-called four-part lights, the two exterior lamps on each side of the vehicle can be seen as a logical group of lights. However, it is particularly preferred if the function is executed axisymmetrically between the right and the left side of the vehicle, which means that the total light image provided by the dynamic operating mode for the entire motor vehicle is axisymmetric with respect to the center of the vehicle at all times, so that in particular symmetry requirements, such as those that may be relevant to approval, may be met at all times, specifically for each time step.

In general, in particular with respect to the variants shown, it should again be noted that the working range of the pseudo-randomization or randomization may be parameterized by boundary conditions, as already mentioned, which means that the range of the allowable segment brightnesses may be defined, in particular also as 0 to 100% of the usable brightness or any other arbitrary combination of usable brightness levels, globally or for individual segments. The function logic described herein may be executed separately per existing surface lighting unit, it may be executed, in particular for lamps with several lighting units, per exterior lamp, and the like. Of course, dynamic groups may also form only partial regions of a total lighting unit or illuminating area, which do not necessarily have to correspond to a specific lighting unit, but may also be defined for subregions of this lighting unit and/or across lighting units.

In addition to the method, the present disclosure also relates to a lighting device for a motor vehicle, wherein the lighting device has at least one exterior lamp and a control device, wherein the exterior lamp has an illuminating area having at least two independently controllable segments each comprising at least one light source, which is characterized in that the control device is designed to carry out the method according to the present disclosure. A motor vehicle according to the present disclosure has such a lighting device according to the present disclosure. All explanations relating to the method according to the present disclosure apply accordingly to the lighting device and the motor vehicle, so that the advantages already mentioned may also be obtained with these.

Figure 1:
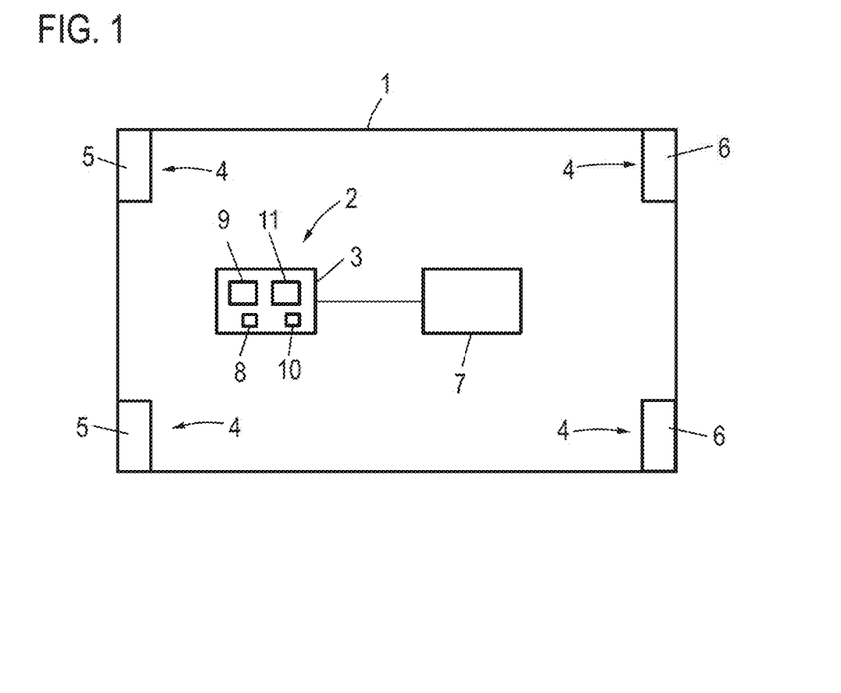
FIG. 1 illustrates a schematic diagram of a motor vehicle, in accordance with some embodiments.

FIG. 1 illustrates a schematic diagram of a motor vehicle 1 according to the present disclosure. The motor vehicle 1 has a lighting device 2 according to the present disclosure, which herein in addition to a control device 3 has two rear lights 5 and two daytime running lights 6 as exterior lamps 4. The control device 3, which may comprise at least one control unit, for example, is designed to communicate with further vehicle systems 7.

Each of the exterior lamps 4 comprises an illuminating area having multiple segments, wherein each segment has at least one light source. The segments may be controlled independently of one another by the control device 3, for example in time steps, the length of which may be 5 to 30 ms, for example, and which may be defined by the clock of a bus which is used for communication with the exterior lamps. The illuminating area of the exterior lamps 4 may result from one or more lighting units of the respective exterior lamp 4, wherein the lighting units may be implemented, for example, as segmented OLEDs, the segments of which may be controlled independently, and/or as LED matrices, in which segments may be formed from one or more individual relays. Preferably, one or more OLEDs are used herein that act as Lambertian emitters, in which the luminance and the emission characteristic (angular distribution) are the same for all segments.

The control device 3 is designed for carrying out the method according to the present disclosure, i.e., in particular for operating the exterior lamps 4 in at least one dynamic operating mode. Whether a or, in the case of multiple dynamic operating modes, which dynamic operating mode is used, may depend, for example, on a signal of another vehicle system 7 and, for example, indicate its activity or, in general, an operating state of the motor vehicle. For example, it is conceivable to use the or a dynamic operating mode when the motor vehicle 1 is operated at least partially autonomous.

In the dynamic operating mode, the appearance of the lamp, defined by luminously operated segments and their brightness after the segments herein are dimmable, changes over time, so that a dynamic light signature is created. The change over time is defined by a sequence of control schemes, wherein each control scheme for each segment contains the information as to whether the segment is to be luminously operated and with which brightness (target brightness) this is to take place. The control scheme may therefore be understood as a type of control image which results in an appearance, wherein the individual segments are image points or pixels.

The special feature here is that the control schemes are determined at least partially in an at least pseudo-randomized manner, i.e., pseudo-randomized or randomized. For this purpose, the control device 3 has a random generator 8 which provides pseudo-random numbers or random numbers. For such random generators 8, which may be implemented, for example, as corresponding software and/or hardware components, a large number of embodiments are already known in the prior art, which do not need to be described in more detail here.

In a determination unit 9 of the control device 3, the control schemes to be used for the control may be determined, wherein at least partial use is made of the pseudo-randomization or randomization possible via the random generator 8, which will be discussed in more detail below. When determining the control schemes or for defining the temporal framework, boundary conditions may be taken into account, which may be stored, for example, in a storage means 10 of the control device 3. A control unit 11 uses the determined control schemes in order to control the exterior lamps 4 accordingly. Boundary conditions can incidentally be manifold and, for example, implement requirements of a set of requirements, for example, that the total brightness, in particular described by total luminous intensities, remains within at least one brightness interval, in particular respective luminous intensity intervals, that a certain geometric manifestation of the exterior lamp 4, in particular certain geometric extents, remains present, and the like. Such requirements of the set of requirements ultimately ensure that the desired light function, in the case of the daytime running light 6 and the rear light 5 the perceptibility by other road users, may be fulfilled, for example in accordance with legal and/or approval requirements. However, boundary conditions may also define the framework in which the pseudo-randomization or randomization may take place or define certain appearance properties obtained for all control schemes, again in particular within the framework of the set of requirements. For example, boundary conditions may describe a minimum and/or a maximum and/or a fixed number of segments to be operated luminously in the dynamic group used for the dynamic light signature and/or a minimum and/or a maximum brightness of segments to be operated luminously and/or variably luminously and/or a minimum and/or maximum and/or fixed step size of the target brightness from one control scheme to the next and/or a definition of segments to be operated with constant brightness.

The dynamic operating mode may extend spatially in different ways with respect to the exterior lamps 4, their lighting units and illuminating areas. For example, the dynamic group of segments addressed by the dynamic operation mode may be defined such that the functional logic is executed separately per existing lighting unit, i.e., the determination unit 23 determines control schemes per existing lighting unit. Of course, only partial regions of individual lighting units are or the definition of dynamic groups, which describe partial regions of the respective lighting units across lighting units, are also conceivable here. It is also conceivable to determine the control schemes per exterior lamp 4, i.e., to determine a control scheme with each change for each exterior lamp 4, wherein in particular all the segments and all lighting units within an exterior lamp 4 may be included. It is also conceivable to carry out the determination of the control schemes in relation to the vehicle side, so that, for example, all exterior lamps 4 on one side of the vehicle, for example the rear or the front, are considered simultaneously. Particularly preferred, however, are specific embodiments in which the determinations of the control schemes are carried out axisymmetrically between the left and right sides of the vehicle, which means that the overall appearance of the dynamic operating mode of the entire motor vehicle 1 or of the entire lighting device 2 is axisymmetrical with respect to the center of the vehicle (longitudinal axis of the vehicle) at all times, so that symmetry requirements may also be met. This may relate, for example, to the reversing lights 5 and to the daytime running lights 6 respectively.

Further, as will be explained in more detail, it is particularly preferred in specific exemplary embodiments to specify, as a boundary condition, a fixed total brightness, which is constant over time, in the form of a total brightness value, for example, in the form of total luminous intensity values for different solid angles or solid angle ranges. This ultimately creates a kind of quasi-static light signature or respectively a quasi-static appearance which fulfills a requirement or demand of constant photometric values and yet exhibits dynamics that significantly improve perceptibility and detectability.

Figure 2:
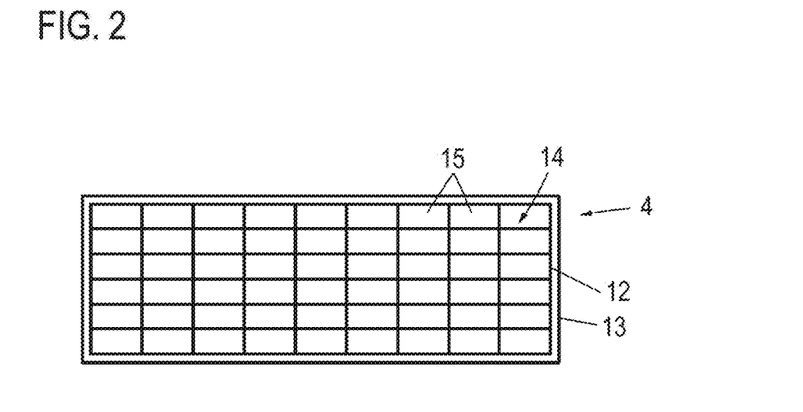
FIG. 2 illustrates a an embodiment of an exterior lamp.

FIG. 2 illustrates a specific, exemplary embodiment of an exterior lamp 4 comprising a segmented OLED 12, which is arranged in a housing 13 and is the only lighting unit defining the illuminating area 14. Here, the partial OLEDs of the segmented OLED 12 form the segments 15.

In other exemplary embodiments, the segments 15 may also be formed by individual LEDs or groups of LEDs corresponding to an LED matrix. As already explained, a plurality of lighting units, for example multiple OLEDs 12, may be used.

In the following, a first specific exemplary embodiment is used to explain in more detail how a randomized light signature with a constant, fixed total brightness value may be generated for the dynamic group. The boundary condition of a fixed, constant total brightness value therefore means that the sum of all the target brightnesses of the control schemes remains constant over time. In other words, it can also be said that the mean value of the target brightnesses is to be constant for all segments 15, that is to say should correspond to a target mean value. It should also be noted at this point that the dimmability of segments 15 may be produced by the drivers, for example via pulse width modulation.

In the present first exemplary embodiment, the following parameters are defined as boundary conditions:
- a minimum brightness of segments 15 to be operated luminously, and therefore a minimum permissible target brightness for each segment 15,
- a maximum brightness of segments 15 to be operated luminously, and therefore a maximum permissible target brightness for each segment 15,
- the fixed total brightness value,
- a duration of a switching interval in time steps, therefore the duration of an interval for which certain segments 15 remain active, here, are operated luminously in a variable manner,
- a fixed number of segments 15 which are to be luminously operated in a variable manner, therefore the number of possible active segments 15,
- a specified step size of the brightness from one control scheme to the next, which defines the value by which the target brightnesses of the individual active segments 15 may change per time step.

In variants of this first exemplary embodiment, constant segments 15 may also be specified, that is to say luminously operated segments 15, which are to be controlled with a constant, always identical target brightness.

The fixed total brightness value does not necessarily have to be expressed as such, as it may be sufficient, for example, if the number of segments 15 is known, to define a target average value for the target brightnesses, compliance with which naturally also always results in the same fixed total brightness value.

It should be noted that, of course, the boundary conditions must be coordinated with one another so that a solution exists in the first place. For example, it must of course apply that the maximum brightness is greater than the target mean value, which in turn should be greater than the minimum brightness. Further, it should be noted at this point that it is of course also conceivable, for example, to define minimums and maximums of the target brightnesses on a segment-specific basis, which may also apply to other parameters or respectively boundary conditions, for example the step size. In the present case, however, the boundary conditions are defined for all segments 15 of the dynamic group.

Figure 3:
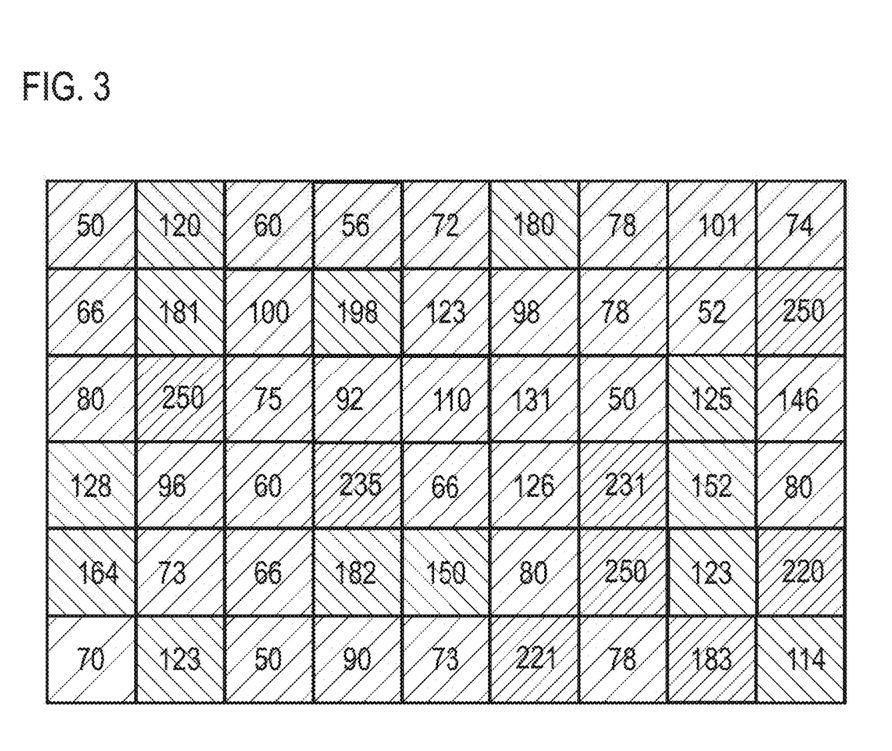
FIG. 3 illustrates a possible initial control scheme for a first exemplary embodiment of the method.

In the dynamic operating mode, an initial control scheme is started at the beginning thereof. FIG. 3 shows an initial control scheme for the exterior lamp 4 shown in FIG. 2, in which all segments 15 have been defined as part of the dynamic group. The numbers shown in the grid indicate brightness values, for example on a scale from 0 to 255, with which segments 15 are to be controlled at the corresponding position. The different hatchings indicate the resulting appearance of the exterior lamp 4. The initial control scheme may either be fixedly specified, or may be determined in a randomized or pseudo-randomized manner by means of the determination unit 9, of course in such a way that the boundary conditions are met. The initial control scheme shown in FIG. 3 applies here by way of example for a minimum brightness of 50, a maximum brightness of 250 and a fixed total brightness value described by a target mean value of 120.

The first switching interval also begins with the initial control scheme of FIG. 3. For this first and all following switching intervals, inactive segments 15 to be operated statically of a first subgroup of segments 15 and active segments 15 of a second subgroup that are to be operated in a temporally variable manner within the switching interval are selected in a pseudo-randomized or randomized manner, namely the mentioned fixed number of segments 15 to be luminously operated in a temporally variable manner in accordance with the boundary condition. In other words, at the beginning of each switching interval, a number of active segments 15 defined in the parameter "fixed number (of active segments 15)" is selected pseudo-randomly or randomly. The random numbers necessary for this are generated by the random generator 8. For the duration of the switching interval, the target brightness of the active segments 15 of the second subgroup is changed in each call, that is to say for each time step, such that the target mean value (and thus the fixed total brightness value) remains constant. This is shown by way of example by the sequence of control schemes of FIG. 4. In this case, a switching interval 16 comprises five time steps 17 by way of example, wherein, in turn, the fixed number of active segments 15 was selected as four, the fixed step size as 20, for simplicity of representation. In the control schemes, the target brightnesses 18 for the active segments 15 are shown highlighted.

Figure 4:
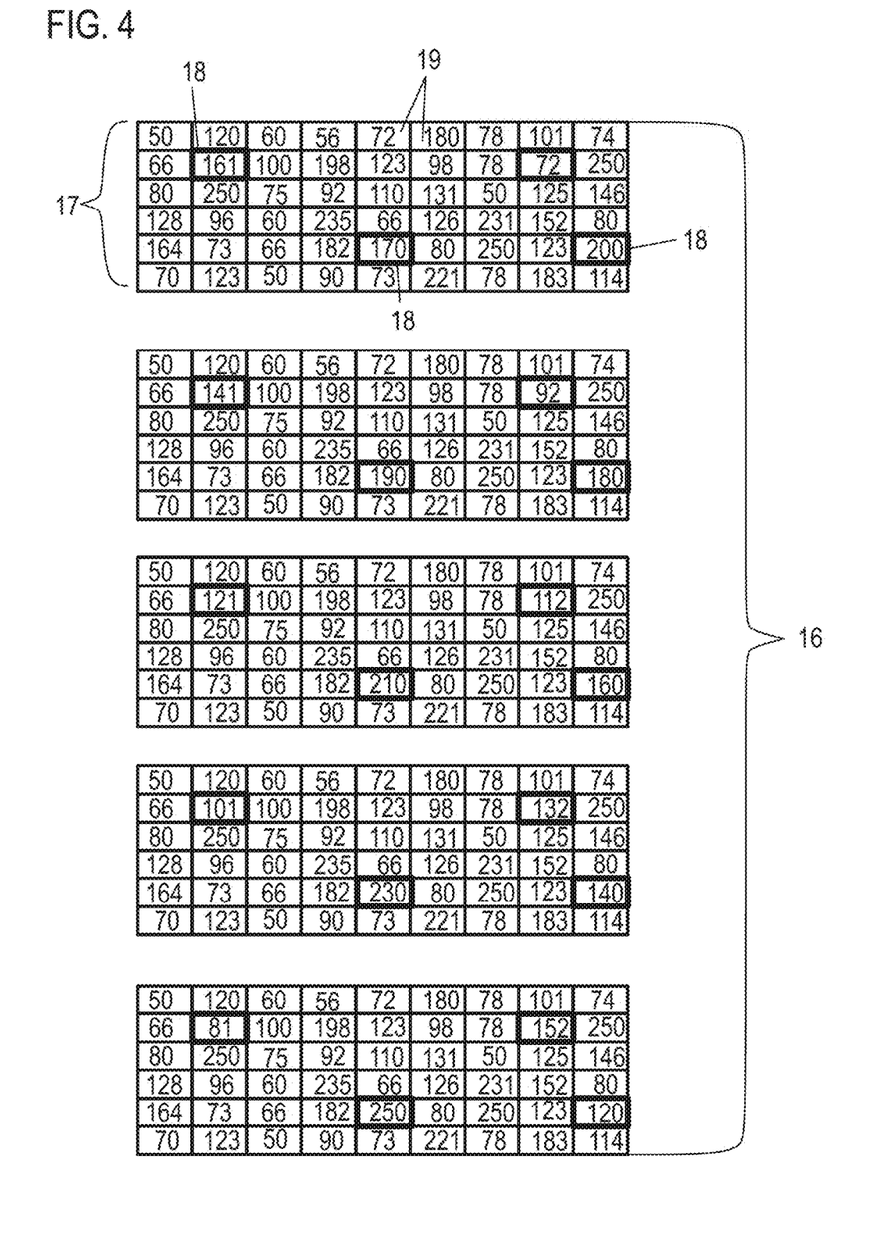
FIG. 4 illustrates control schemes for a switching interval in the first embodiment variant.

Here, two segments 15 of the here even number of active segments 15 due to the fixed step size are assigned to one another, which may be selected pseudo-randomly or randomly just like the fixed direction of change of the target brightness 18 (increasing or decreasing), so that changes in the target brightnesses 18 always cancel each other out and the total brightness continues to correspond to the fixed total brightness value. Within the switching interval 16, the remaining target brightnesses 19 (not highlighted) remain constant, i.e., completely unchanged (inactive segments 15).

After completion of the switching interval 16, the first subgroup and the second subgroup, i.e., the inactive and the active segments, are determined anew. In a first variant, which creates a calmer, yet still dynamic impression, the target brightnesses 18, 19 in the last time step 17 of the preceding switching interval 16 are taken as a basis; in a more vivid second variant, the target brightnesses 18, 19, in particular at least for the new active segments 15 (target brightnesses 18) may be determined anew in a pseudo-randomized or randomized manner. In doing so, the changes from one control scheme to the next control scheme are of course carried out within the specified limits (by the minimum and maximum brightness).

In a second embodiment, multiple dynamic groups, each locally contiguous but disjoint, may be defined for the segments 15 of the exterior lamp 4. The advantage of this local dynamic grouping is that an entry may be configured in a differentiated manner for a total brightness of the individual dynamic groups that is fixed, in particular by a fixed total brightness value. This makes it possible to compensate for the different contributions to the total brightness by the different segments 15, e.g., by different beam angles, and to achieve an overall constant total brightness despite the dynamic control.

In this second exemplary embodiment, the following parameters may be used to define boundary conditions and dynamic groups:

group definition, i.e., the number of dynamic groups and the assignment of the segments 15 to the dynamic groups, wherein each segment 15 may only be assigned to one dynamic group, constant segments 15, i.e., such segments 15 which are to be controlled with a constant target brightness over time, wherein dynamic groups may also be assigned to these segments 15, so that ultimately all segments 15 of an exterior lamp 4 are assigned to dynamic groups, initial values for segments 15 which are to be luminously operated in a variable manner and which define the initial target brightness for all non-constant segments 15 at the beginning of the dynamic operating mode and may be defined individually or globally for each segment 15 to be luminously operated in a variable manner; alternatively, of course, a pseudo-randomized or randomized determination of target brightnesses for the initial control scheme, as in the first exemplary embodiment, may also take place, updating time, i.e., the number of time steps between two changes of the target brightness of a dynamic group, which may be defined individually for each dynamic group or globally for all dynamic groups, fixed total brightness values which are individually definable for each dynamic group or globally for all dynamic groups; ideally, a fixed total brightness specified for all dynamic groups is divided among the dynamic groups into fixed dynamic group total brightness values that are applicable to them, minimum and maximum brightness of luminously operated segments 15 as already defined above, wherein a definition specific for each dynamic group or also a global definition is possible here.

At the beginning of the dynamic operating mode, an initial control scheme is used, which may be specified, as described above, or is determined in a pseudo-randomized or randomized manner, in which, if certain segments 15 are to be controlled with a constant target brightness, this constant target brightness is of course assigned to them.

In this second exemplary embodiment, the determination of new target brightnesses for a respective dynamic group, i.e., an updating of the control schemes, is carried out cyclically after the parameterized updating time of the dynamic group has elapsed. A new random number is generated as a target brightness by the random generator 8 for each segment to be luminously operated in a variable manner. Again, as in general, the random number generator 8 may be a non-deterministic generator, a deterministic generator, or a hybrid approach (for example, a deterministic generator with an initial value that depends on the current time, for example). Any distribution of random numbers may be used, for example, a uniform distribution or a normal distribution.

Returning to the second exemplary embodiment, when updating the control scheme for at least one dynamic group, the random numbers which are to be used as target brightnesses are of course limited by the minimum and maximum brightnesses, as the case may be specifically for the dynamic group. If, when determining a new control scheme for at least one dynamics group, it is found that the sum of the target brightnesses of all segments of the dynamics group determined in this way does not match the fixed total brightness value for this dynamics group, the deviation value is the brightness to be compensated. This brightness to be compensated is distributed evenly to all segments of the dynamic group that are to be operated in a variable luminous manner.

It should be noted that the newly determined target brightnesses, i.e., the newly determined control schemes, may be used to control the segments of the dynamic group immediately after they have been determined. In one variant, however, it is also conceivable, especially if the updating time comprises multiple time steps, for the target brightness to be dimmed up or down from a target brightness value of the last control scheme to the newly determined target brightness value within the updating time in order to bring about smooth transitions.

In a third exemplary embodiment, a new pseudo-random or random appearance with partially switched-off segments 15 may also be generated for each control scheme. Here, the following parameters may be used to describe the boundary conditions:

minimum and maximum brightness, as described above, the duration of a switching interval in time steps, i.e., an interval in which the same switched-on segments 15 are to be luminously operated, fixed number of segments 15 to be luminously operated, i.e., the number of segments 15 per switching interval which are to be luminously operated.

In this third exemplary embodiment, a specified, fixed number of segments 15 that are to be luminously operated, therefore switched on, are selected in a pseudo-randomized or randomized manner and are assigned a target brightness that is determined in a pseudo-randomized or randomized manner, while the remaining segments 15, a first subgroup, of the dynamic group remain switched off, therefore in particular are assigned the target brightness 0. The target brightness for the switched-on segments 15, which form a second subgroup, lies between the minimum and maximum brightness specified as a boundary condition. In one variant of this third exemplary embodiment, the switching on and off may take place in an animated manner, for example from the last target brightness or respectively from the switched-off state in a linear ramp to the new target brightness or the switched-off state.

Figure 5:
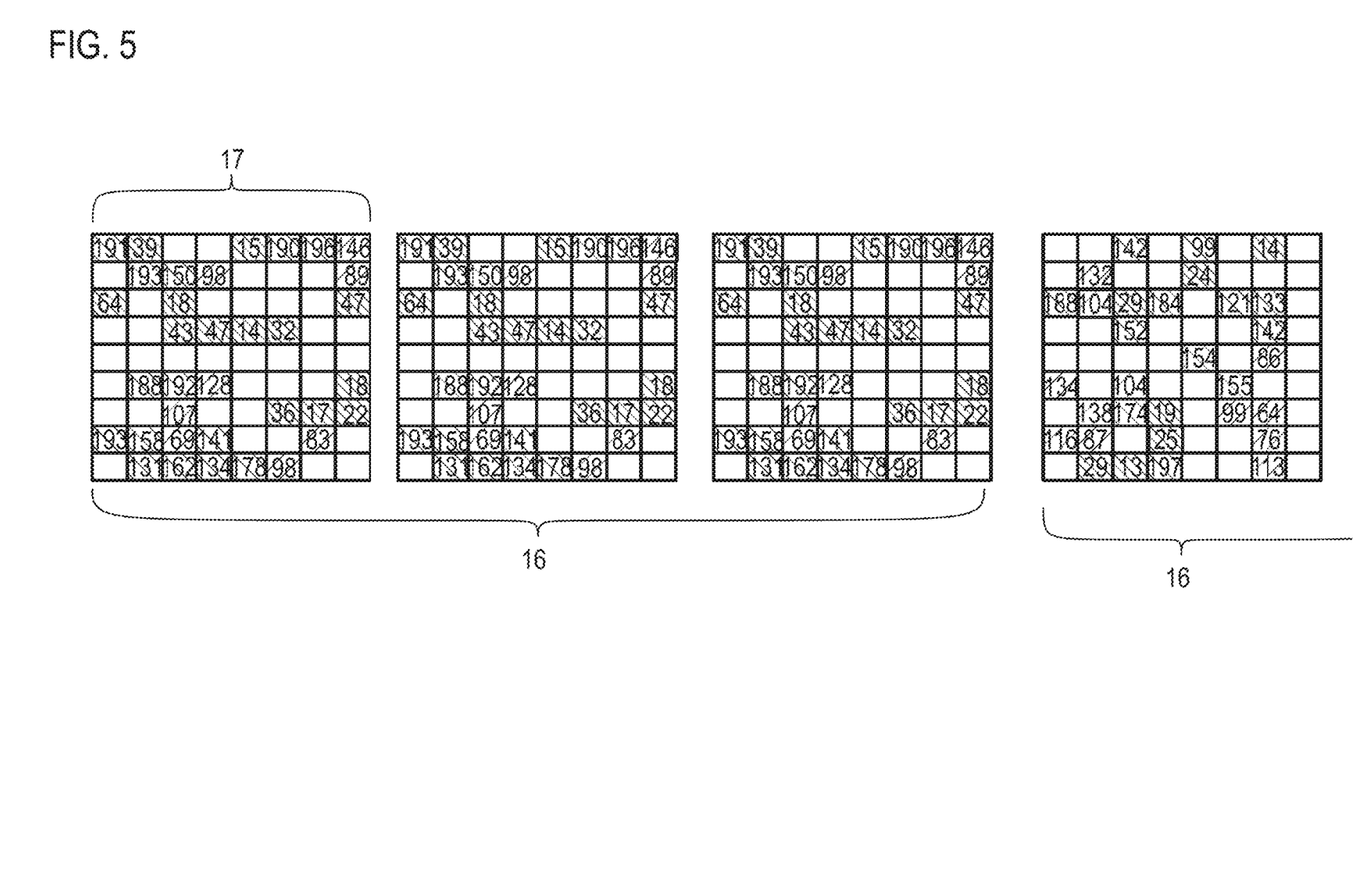
FIG. 5 illustrates control schemes for a third exemplary embodiment of the method.

FIG. 5 explains this in a sequence of control schemes for a square illuminating area of 8×8 segments 15 by way of example. A switching interval 16 comprises three time steps 17, during which the control scheme remains completely unchanged. Entries with numbers, i.e., target brightnesses, correspond to target brightnesses for switched-on segments 15 of the second subgroup, while empty fields correspond to switched-off segments 15 of the first subgroup, i.e., a target brightness of zero. As can be seen, the control scheme changes exactly like the switched-on segments 15 at the beginning of a following switching interval 16.

In a fourth exemplary embodiment, at least two offset triangular pulses may be used for generating counter-rotating light movements, which means that while one segment 15 is dimmed up, at the same time another is dimmed down in order to produce a constant, solid total brightness.

Here, for example, the following parameters may be used:

minimum and maximum target brightnesses connecting the ramps of the respective triangular pulses, ramp intervals for the respective triangular pulses, i.e., the duration of an interval in which an affected segment 15 changes from the minimum target brightness to the maximum target brightness and back or from the maximum target brightness to the minimum target brightness and back, fixed number of active segments 15, i.e., segments 15 whose target brightness is to be adjusted at any time on the basis of a triangular pulse.

Figure 6:
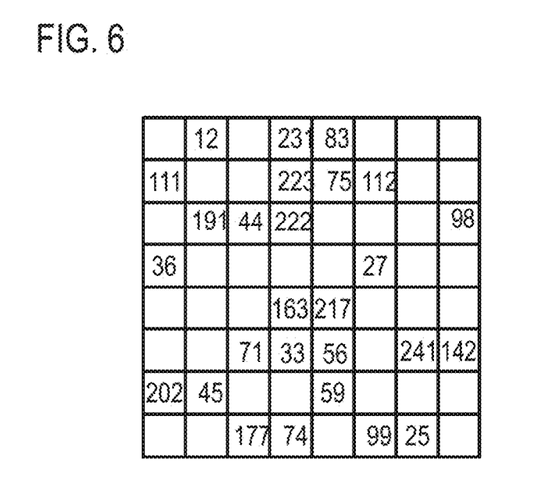
FIG. 6 illustrates an initial control scheme for a fourth exemplary embodiment of the method.
Figure 7:
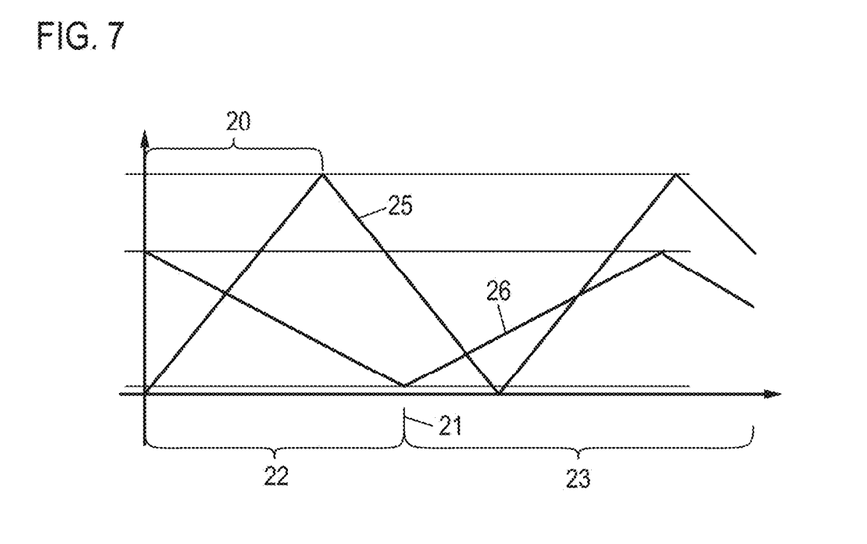
FIG. 7 illustrates usable triangular pulses running in an offset manner.

In this fourth exemplary embodiment, the pseudo-randomization or randomization results from selecting respective segments 15 of the dynamic group to be affected by a triangular pulse. As an initial control scheme at the beginning of the dynamic operation mode, the fixed number of segments 15 is randomly or pseudo-randomly selected and assigned one of the triangular pulses each. The initial target brightness is defined randomly or pseudo-randomly between the minimum and maximum target brightness of the triangular pulse in order to avoid that all triangular pulses start at the same time. An exemplary initial control scheme is shown in FIG. 6. FIG. 7 shows by way of example the course of triangular pulses 25, 26, wherein half of the ramp interval duration 20 for triangular pulse 24 is shown by way of example. At a time 21, an instance of the ramp pulse 26 ends, so that a pseudo-randomized or randomized change from a previous segment in time period 22 to a new segment in time period 23 occurs here.

Figure 8:
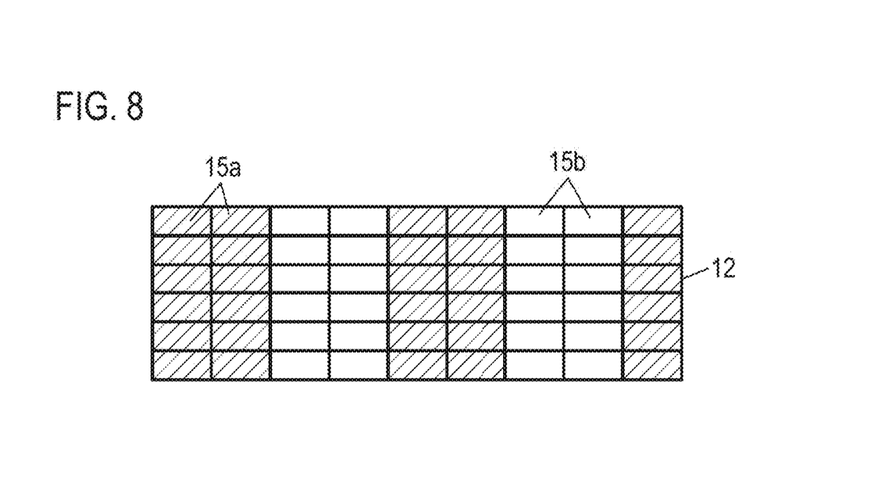
FIG. 8 illustrates possible definitions of dynamic ranges and static ranges in a first variant.
Figure 9:
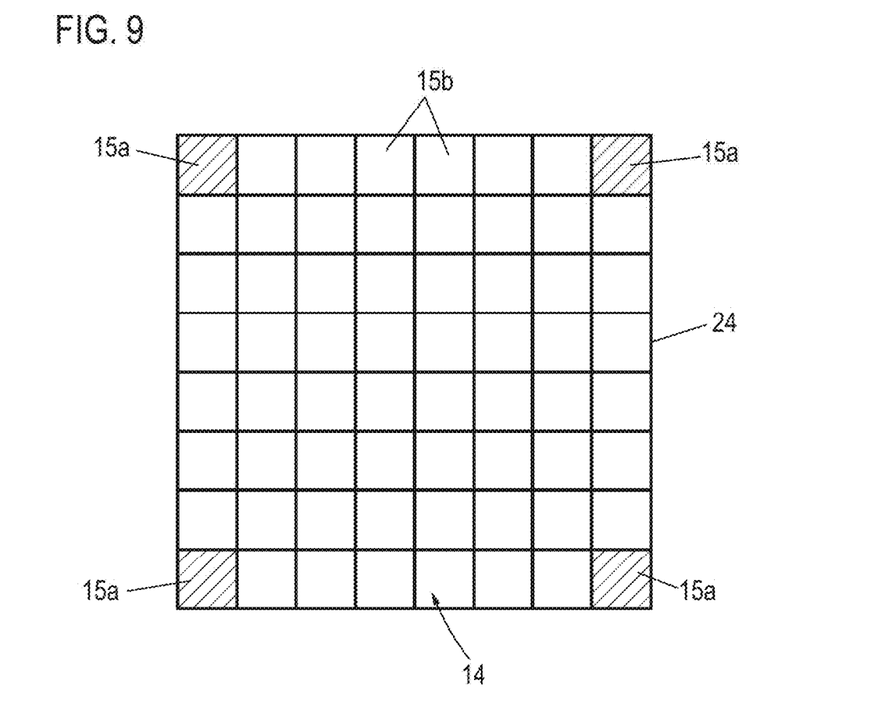
FIG. 9 illustrates a possible definition of a static range in a second variant.

Even though exemplary embodiments have been shown so far by way of example for which the dynamic group comprises all segments 15 of the illuminating area 14 of a respective exterior lamp 4, it is also conceivable to remove at least some segments 15 from the dynamic groups, so that these form static groups. An example of the OLED 12 of FIG. 2 is shown in FIG. 8, in which hatched segments 15*a* belong to at least one static group, and non-hatched segments 15*b* belong to at least one dynamic group. For example, a conventional static light signature, which is supplemented by a dynamic light signature and the like, may be maintained in this way. In the example of FIG. 9, which refers to a square OLED 24, the segments 15*a* (again shown hatched) of a static group that are to be operated statically are selected as edge segments, so that a certain geometric extension of the illuminating area 14 is always present, since these segments 15*a* are always operated luminously.

However, it should be noted that, as has been explained in particular for the first and second exemplary embodiments, such "static segments" may also be included in dynamic groups via corresponding boundary conditions.

The invention claimed is:

1. A method for operating a lighting device for a motor vehicle, wherein the lighting device has an exterior lamp and a control device, wherein the exterior lamp has an illuminating area having at least two segments, the at least two segments being independently controllable, and wherein the at least two segments each comprises a light source, the method comprising:

running, in a dynamic operating mode of the control device, a dynamic group of segments, using a pseudo-randomized or randomized manner, temporally variable lighting operation of the dynamic group of the segments, the dynamic group of the segments comprising a plurality of segments, wherein the dynamic operating mode includes a temporal sequence of control schemes, and wherein, for each segment of the dynamic group, each control scheme describes whether and/or at what brightness each respective segment is to be operated;

controlling, by the control device, in the dynamic operating mode, the segments of the dynamic group in successive time steps, wherein a switching interval is a multiple of a time step;

determining the control schemes assigned to each time step of the temporal sequence according to a boundary condition, the boundary condition relating to an appearance of the exterior lamp and/or the boundary condition limiting the determination of the control schemes, wherein the determining the control schemes comprises:

selecting, for each switching interval, in the pseudo-randomized or randomized manner, a first subgroup of the segments of the dynamic group having inactive segments to be operated statically during the switching interval, and selecting, for each switching interval, in the pseudo-randomized or randomized manner, a second subgroup of the segments of the dynamic group having active segments to be operated in a temporally variable manner during the switching interval; and changing, in each switching interval for each time step, brightness exclusively for the active segments, wherein the boundary condition includes maintaining of a fixed total brightness value of all luminously operated segments over the temporal sequence, whereby brightness increases and brightness decreases cancel each other out over the successive time steps of the switching interval.

2. The method according to claim 1, wherein the boundary condition or a plurality of the boundary conditions describe a specified geometric extent of a geometric appearance of the dynamic group defined by the luminously operated segments.

3. The method according to claim 1, wherein the boundary condition or a plurality of the boundary conditions describe at least one of:

a minimum number of segments to be operated in a luminous or variable luminous manner in the dynamic group;

a maximum number of segments to be operated in the luminous or variable luminous manner in the dynamic group;

a fixed number of segments to be operated in the luminous or variable luminous manner in the dynamic group;

a minimum brightness of segments to be operated luminously;

a maximum brightness of segments to be operated luminously;

a minimum step size of brightness from one control scheme to a next;

a maximum step size of brightness from the one control scheme to the next;

a defined step size of the brightness from the one control scheme to the next; or a predefinition of segments to be operated with constant brightness.

4. The method according to claim 1, wherein a plurality of disjoint dynamic groups of the exterior lamp are used, the plurality of disjoint dynamic groups having different boundary conditions.

5. The method according to claim 4, wherein the plurality of disjoint dynamic groups are spatially contiguous.

6. The method according to claim 4, wherein the plurality of disjoint dynamic groups are aligned with different sides of the motor vehicle.

7. The method according to claim 4, wherein a common boundary condition is used for at least two of the plurality of disjoint dynamic groups of the exterior lamp.

8. The method according to claim 1, wherein for each time step in each switching interval, the changing the brightness further includes monotonically increasing or decreasing with time or with a fixed step size specified as the boundary condition.

9. The method according to claim 1, wherein the changing the brightness further includes increasing and decreasing the brightness associated with a pair of the active segments such that they cancel each other out.

10. The method according to claim 1, wherein the changing the brightness further comprises at least one of:
   using the brightness used in a last time step of a preceding switching interval as a starting point for a first time step of a subsequent switching interval at least for the now active segments; or
   determining, new brightness as the starting point in the pseudo-randomized or randomized manner for each switching interval at least for the active segments.

11. The method according to claim 1, wherein the switching interval includes one or more time steps, and wherein the determining the control schemes further comprises:
   selecting, for each switching interval, in the pseudo-randomized or randomized manner, the first subgroup of the segments of the dynamic group having switched-off segments which are not luminously operated for the switching interval; and
   selecting, for each switching interval, in the pseudo-randomized or randomized manner, the second subgroup having switched-on segments which are to be luminously operated for the switching interval.

12. The method according to claim 11, wherein the determining the control schemes further comprises at least one of:
   selecting, for each switching interval, the brightness of the switched-on segments in the pseudo-randomized or randomized manner;
   switching the switched-on segments toward a maximum brightness stepwise over a plurality of time steps of the switching interval; or
   switching the switching-off segments from the maximum brightness stepwise over the plurality of time steps of the switching interval.

13. The method according to claim 1,
   wherein in the dynamic operating mode, the control device controls the brightness of the segments,
   wherein the segments are selected in the pseudo-randomized or randomized manner,
   wherein the brightness of the segments are to be variably luminously operated according to at least two triangular pulses, and
   wherein the at least two triangular pulses are temporally offset with respect to one another such that the fixed total brightness value for the dynamic group is maintained by the offset of the triangular pulses.

14. The method according to claim 1, wherein:
   the segments are formed by a segmented organic light-emitting diodes (OLED) of the exterior lamp or by a light-emitting diode (LED) matrix of the exterior lamp,
   at least one exterior lamp is a rear light or a daytime running light, and/or,
   all the segments have a same luminance or emission characteristic.

15. The method according to claim 1, further comprising:
   using the dynamic operating mode if the motor vehicle is at a standstill,
   using the dynamic operating mode if the motor vehicle is in a driving mode, or
   indicating, by the dynamic operating mode, an operating state of the motor vehicle.

16. The method according to claim 15, wherein the operating state is a partial autonomous operation.

17. The method according to claim 15, wherein the operating state is an activity of a specific driver assistance system.

18. The method according to claim 1, wherein in addition to the dynamic group, a static group is used, the static group being disjoint to the dynamic group, wherein the static group comprises at least one segment, and wherein the least one segment of the static group are switched permanently on or switched permanently off.

19. The method according to claim 18, wherein the static group comprises segments that are always illuminated at an edge of the illuminating area, the edge being a corner of the illuminating area.

20. The method according to claim 1, wherein the lighting device comprises two exterior lamps, wherein the two exterior lamps are arranged symmetrically according to at least one axis of symmetry or are spatially adjacent and assigned to one another, the two exterior lamps having corresponding dynamic groups for which common control schemes are determined.

21. The method according to claim 20, wherein the two exterior lamps assigned to one another are arranged symmetrically on a side of the motor vehicle, wherein the control schemes are determined in a mirrored manner such that resulting appearances are symmetrical to a center of the motor vehicle.

22. A lighting device for a motor vehicle, wherein the lighting device comprises an exterior lamp and a control device, wherein the exterior lamp has an illuminating area having at least two segments, the at least two segments being independently controllable, wherein the at least two segments each comprises a light source, and wherein the control device is configured to;
   run, in a dynamic operating mode of the control device, a dynamic group of segments, using a pseudo-randomized or randomized manner, temporally variable lighting operation of the dynamic group of the segments, the dynamic group of the segments comprising a plurality of segments,
   wherein the dynamic operating mode includes a temporal sequence of control schemes, and
   wherein, for each segment of the dynamic group, each control scheme describes whether and/or at what brightness each respective segment is to be operated;
   control, in the dynamic operating mode, the segments of the dynamic group in successive time steps,
   wherein a switching interval is a multiple of a time step;
   determine the control schemes assigned to each time step of the temporal sequence according to a boundary condition, the boundary condition relating to an appearance of the exterior lamp and/or the boundary condition limiting the determination of the control schemes, wherein the determining the control schemes comprises:
   selecting, for each switching interval, in the pseudo-randomized or randomized manner, a first subgroup of the segments of the dynamic group having inactive segments to be operated statically during the switching interval, and selecting, for each switching interval, in the pseudo-randomized or randomized manner, a second subgroup of the segments of the dynamic group having active segments to be operated in a temporally variable manner during the switching interval; and change, in each switching interval for each time step, brightness exclusively for the active segments, wherein the boundary condition includes maintaining of a fixed total brightness value of all luminously operated segments over the temporal sequence, whereby brightness increases and brightness decreases cancel each other out over the successive time steps of the switching interval.

23. A motor vehicle comprising a lighting device, wherein the lighting device has an exterior lamp and a control device, wherein the exterior lamp has an illuminating area having at least two segments, the at least two segments being independently controllable, wherein the at least two segments each comprises a light source, and wherein the control device is configured to:

run, in a dynamic operating mode of the control device, a dynamic group of segments, using a pseudo-randomized or randomized manner, temporally variable lighting operation of the dynamic group of the segments, the dynamic group of the segments comprising a plurality of segments, wherein the dynamic operating mode includes a temporal sequence of control schemes, and wherein, for each segment of the dynamic group, each control scheme describes whether and/or at what brightness each respective segment is to be operated;

control, in the dynamic operating mode, the segments of the dynamic group in successive time steps, wherein a switching interval is a multiple of a time step;

determine the control schemes assigned to each time step of the temporal sequence according to a boundary condition, the boundary condition relating to an appearance of the exterior lamp and/or the boundary condition limiting the determination of the control schemes, wherein the determining the control schemes comprises:

selecting, for each switching interval, in the pseudo-randomized or randomized manner, a first subgroup of the segments of the dynamic group having inactive segments to be operated statically during the switching interval, and selecting, for each switching interval, in the pseudo-randomized or randomized manner, a second subgroup of the segments of the dynamic group having active segments to be operated in a temporally variable manner during the switching interval; and change, in each switching interval for each time step, brightness exclusively for the active segments, wherein the boundary condition includes maintaining of a fixed total brightness value of all luminously operated segments over the temporal sequence, whereby brightness increases and brightness decreases cancel each other out over the successive time steps of the switching interval.

24. The method according to claim 1, further comprising:

determining second control schemes assigned to each time step of the temporal sequence according to the boundary condition, the boundary condition relating to the appearance of the exterior lamp and/or the boundary condition limiting the determination of the second control schemes;

changing, in each switching interval for each time step, the brightness exclusively for the active segments, wherein the boundary condition includes maintaining of a second fixed total brightness value of the luminously operated segments over the temporal sequence;

determining a brightness difference between the first fixed total brightness value and the second fixed total brightness value; and distributing the brightness difference evenly to the luminously operated segments over the temporal sequence.

* * * * *